No. 875,596.
PATENTED DEC. 31, 1907.
L. M. PERKINS.
TROLLEY POLE RETRIEVER.
APPLICATION FILED MAY 6, 1907.
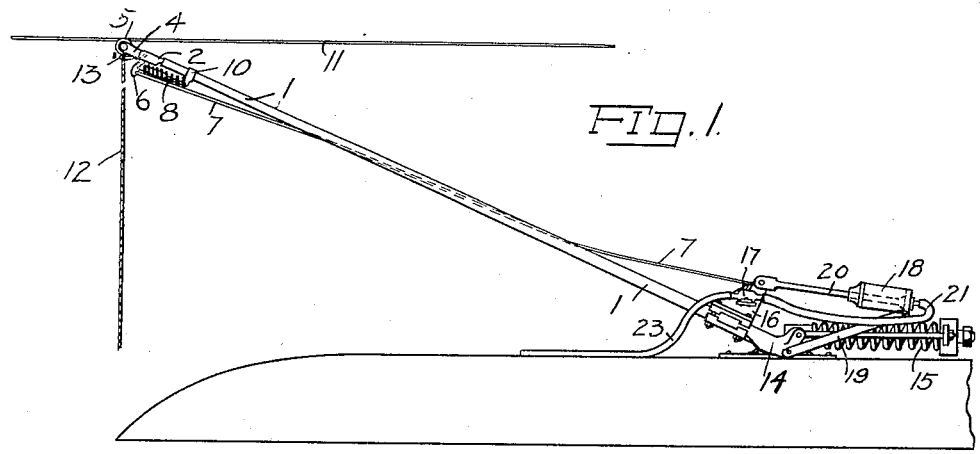
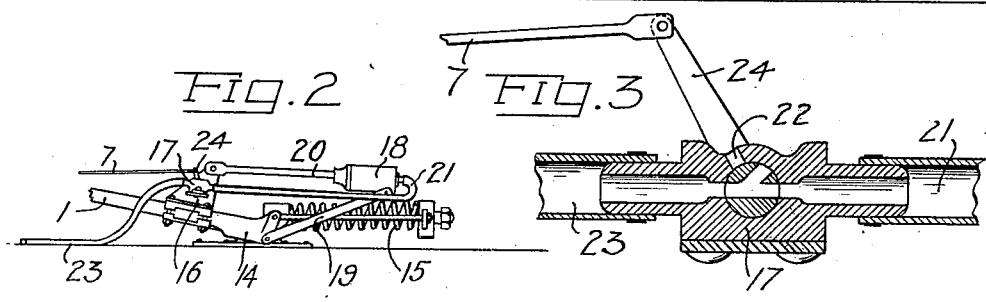
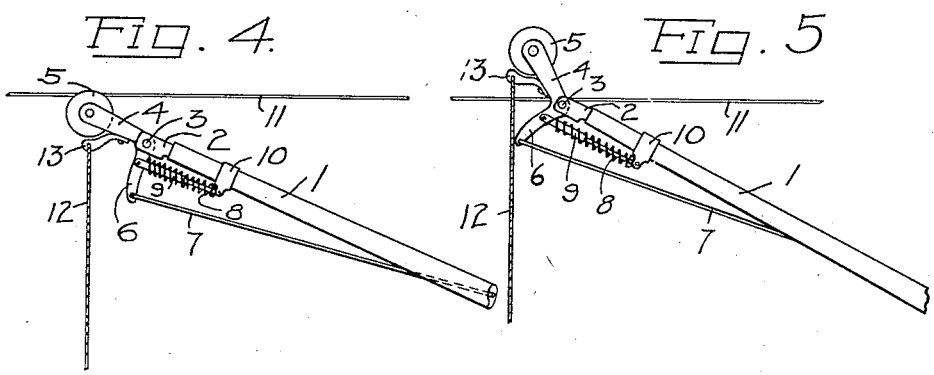
Witnesses
M. A. Van Hous
C. H. Morse
Inventor
Luther M. Perkins
By
R. H. Elliott
Attorney

UNITED STATES PATENT OFFICE.

LUTHER M. PERKINS, OF TACOMA, WASHINGTON.

TROLLEY-POLE RETRIEVER.

No. 875,596.  Specification of Letters Patent.  Patented Dec. 31, 1907.

Application filed May 6, 1907. Serial No. 372,187.

*To all whom it may concern:*

Be it known that I, LUTHER M. PERKINS, a citizen of the United States of America, residing at Tacoma, in the county of Pierce and State of Washington, have invented certain new and useful Improvements in Trolley-Pole Retrievers, of which the following is a specification, reference being had therein to the accompanying drawing.

This invention relates to devices for automatically lowering a trolley pole when the trolley wheel has jumped from the trolley wire, and has for its object to provide a mechanism which shall normally allow perfectly free movement of the trolley pole to follow the wire, but which will immediately lower the pole when it has left the wire, and which mechanism shall be automatically shut off from action, to release the pole and allow it to be raised, by the simple act of pulling the trolley rope taut and allowing the pole to be raised slowly by the action of the usual trolley-pole-springs. I attain this object by the devices and mechanism illustrated in the accompanying drawing, in which -

Figure 1 is a side elevation showing a trolley-pole provided with my mechanism and having the wheel in contact with the wire as under normal conditions; Fig. 2 is a side view of the trolley-pole lowering air-cylinder mounted in place; Fig. 3 is a vertical section of the air valve; Fig. 4 is a view of upper end of the trolley pole showing the wheel in contact with the trolley wire; and Fig. 5 is a similar view showing the trolley wheel just after it has jumped from the wire.

Similar numerals of reference refer to similar parts throughout the several views.

My invention consists of a trolley harp, of novel design, pivotally mounted on the end of the trolley pole in such a way that so long as the wheel is engaging the wire the harp is in its normal position, but when the wheel leaves the wire the harp turns on its pivot, under the action of a spring, and this turning motion is communicated by means of a rod to an air valve to open connection between a compressed air source or reservoir and a cylinder whose piston is connected, by a suitable rod, to the trolley pole in such manner than when the piston is actuated by the air the pole is forced downward against the action of the pole spring.

Into the end of the trolley pole 1 is driven the end of the fork 2 to which is pivoted on a horizontal pin 3 the harp 4. The harp 4 carries the usual trolley wheel 5 at its end, and has a lever 6, extending at right angles to it, to which is secured the rod 7 connecting it to the air valve at the base of the trolley. A spring 8 is wound around the telescoping guide rods 9 secured to the lever 6 and to the ring 10 on the trolley pole 1, said spring being compressed between the lever 6 and the ring 10 so that when the wheel 5 is disengaged from the trolley wire 11, the spring 8 will force the harp 4 into the position shown in Fig. 5. The trolley rope 12 is secured to an extension or lug 13 below the wheel 5 so that when the rope is pulled the harp 4 is returned to its normal position, relatively to the pole 1, against the action of the spring 8.

The lower end of the pole 1 is inserted in the usual manner into the socket 14 pivoted in vertical and horizontal directions to the top of the car and carrying the usual pole spring 15 which keeps the pole 1 pressed upward in the usual manner. A bracket 16 is secured to or formed on the socket 14 and the air valve 17 is mounted on the side thereof. The air cylinder 18 is mounted above the spring 15 and is secured against longitudinal movement by the tie bars 19 joining it to the trolley base whereby the cylinder is allowed a slight vertical movement, so that when the trolley pole is secured down (not being in use) the said cylinder will rise a few inches off the top of the spring 15. When the trolley pole is in use the cylinder rests on the spring 15. In this manner I can use a much shorter cylinder than would be necessary if I were to make it long enough to allow the pole to be fastened down. The piston of the air cylinder acts through the piston rod 20 on the bracket 16 to which the outer end of said piston rod is secured. Since the tie bars 19 allow a vertical or turning movement of the cylinder, it is possible to connect the piston thereof directly to the bracket 16 without the interposition of the usual connecting rod which would be necessary if the cylinder were secured against any vertical movement. The air valve 17 is of any convenient form, all that is necessary is that when it is in its normal position the pipe 21 connecting it to the cylinder 18 shall be connected to the free air through the passage 22, and that when it is in operative position, the pipe 21 shall be in communication with the pipe 23 through which compressed air is supplied to the cylinder as shown in Fig. 3. The rod 7 is connected to the lever 24 of the valve 17 and controls it. Thus when the wheel has left the wire 11, the rod 7 is pulled and the valve 17 turned so that air is admitted to the cylinder 18; the air forces the piston and piston rod, against the action of the spring 15, and lowers the trolley pole 1 and keeps it lowered until the rope 12 is pulled and turns the harp 4 on the pivot 3, against the action of the spring 8, and turns the valve 17, by means of the rod 7, into its normal position and exhausts the air from the cylinder through the pipe 21 and the passage 22, and as the air is exhausted the spring 15 overcomes it and raises the pole 1.

Having described my invention, what I claim is:

In a trolley pole retriever, the combination with a base, of a spring actuated trolley pole pivoted thereto, a pneumatic cylinder linked to said base by tie bars and adapted to press against a part of said base, a piston and rod operating in said cylinder and engaging said trolley pole to lower it when actuated, a valve controlling the actuating pressure in said cylinder, a harp pivoted to said trolley pole and adapted to turn on its pivot when disengaged from the trolley wire, and means joining said pivoted harp and said valve whereby said valve is moved by the turning of said harp on its pivot independently of any movement of the trolley pole.

In testimony whereof I affix my signature in presence of two witnesses.

LUTHER M. PERKINS.

Witnesses:
J. W. A. NICHOLS,
A. J. BAIR.